United States Patent [19]

Piper et al.

[11] Patent Number: 4,538,743
[45] Date of Patent: Sep. 3, 1985

[54] SAFETY COVER FOR AUXILIARY BRAKE OPERATING CASING

[76] Inventors: Melvin E. Piper; May P. Piper, both of Box 54, Hollidaysburg, Pa. 16648

[21] Appl. No.: 665,755

[22] Filed: Oct. 29, 1984

[51] Int. Cl.³ .............................................. B65D 55/16
[52] U.S. Cl. ................................................... 220/375
[58] Field of Search ...................... 220/375, 315, 85 P; 138/89

[56] References Cited

U.S. PATENT DOCUMENTS 1,021,203  3/1912  Matchette ........................... 220/375
3,490,177  1/1970  Perrion ................................ 220/375

Primary Examiner—George T. Hall
Attorney, Agent, or Firm—Jay M. Cantor

[57] ABSTRACT

A shatter-proof safety cover for the casing of an auxiliary brake mechanism mounted on trucks or trailers, is provided. The cover fits about the casing containing the auxiliary brake operating mechanism and which is subjected to the same air pressure as primarily employed for operating the brakes. The cover is removably retained on the casing by chains or other devices temporarily secured to some stationary part of the vehicle and prevents portions of the casing from flying about and injuring maintenance personnel if the casing had previously been weakened due to exposure to the elements.

2 Claims, 4 Drawing Figures

SAFETY COVER FOR AUXILIARY BRAKE OPERATING CASING

BACKGROUND OF THE INVENTION

FIELD OF THE INVENTION

This invention relates to a safety cover for metallic casing mounted on a vehicle in an exposed location and which is subjected to great internal pressures.

Such casings are usually mounted adjacent the wheels of large vehicles of the trailer-truck type and contain auxiliary mechanism therewithin for automatically setting the brakes on such vehicle in case of a drop in pressure of the fluid conventionally used in operating the normal braking system; as when the vehicle is stopped. Such auxiliary brake operating mechanism is disclosed in U.S. Pat. No. 2,992,630 issued to Leighton et al. and U.S. Pat. No. 3,302,536 issued to Fites.

The casing containing the auxiliary brake operating mechanism deteriorates in time due to exposure to the elements to being hit by objects lying on the road such as stones and the walls weaken due to rusting. It has happened in the past that such casings, after being thus weakened, have exploded due to the large internal pressures therein and caused parts to fly about at great speed and have inflicted grave injuries to personnel in the vicinity who service and maintain the vehicles.

In order to prevent parts of the auxiliary brake operating mechanism from flying about when the casing shatters, we have devised a cover to be placed temporarily about the casing when the vehicle is being serviced, so as to insure the safety of the workers, which cover may be easily applied to the casing and removed therefrom at will.

OBJECTS OF THE INVENTION

The main object of the invention is to provide a shield or safety cover for the casing of an auxiliary brake operating mechanism which is attached to a vehicle at a wheel to be braked, so as to shield personnel from shock or injury if the casing should explode.

A secondary object of the invention is to provide a hold-down means for the above mentioned shielding cover to retain it on the casing and prevent it from flying off in the event the casing explodes.

DESCRIPTION OF THE INVENTION

Figure 1:
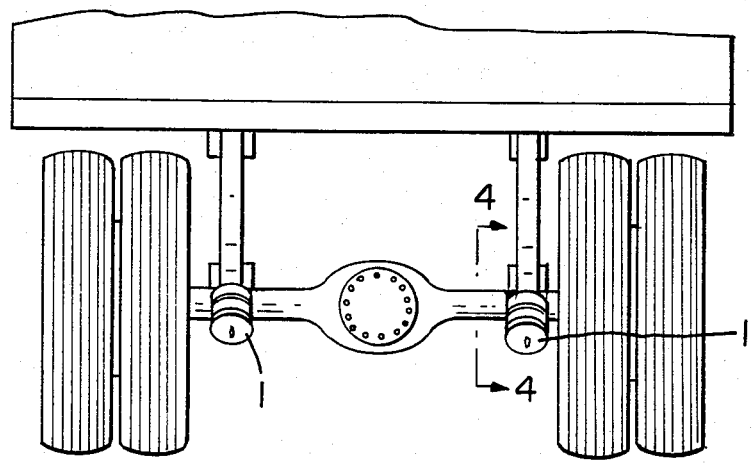
FIG. 1 shows the rear of a truck or trailer which is provided with hydraulic brakes operated from a central point, as well known in the art, and also with an auxiliary brake operating device at each wheel.
Figure 2:
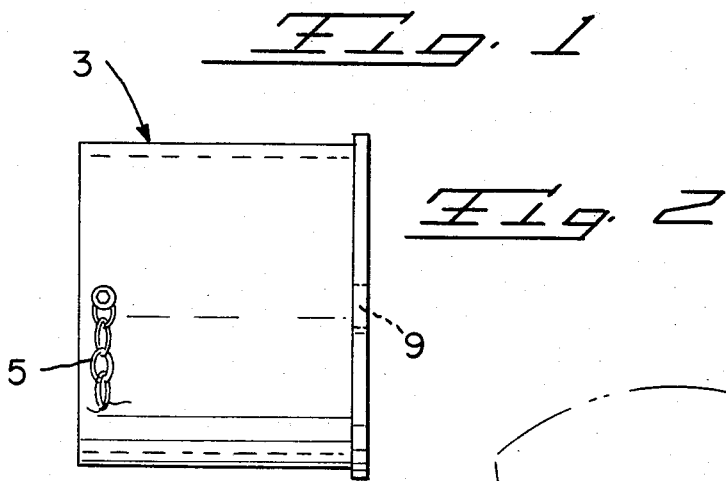
FIG. 2 is a plan view of the shielding cover which fits over the casing of the auxiliary brake operating mechanism.
Figure 3:
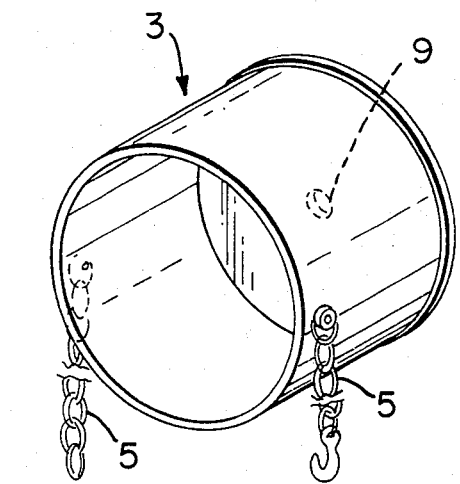
FIG. 3 is a perspective device of the cover with chain members attached to retain it on the casing of the auxiliary brake operating mechanism.

As shown in FIG. 1, the auxiliary brake operating mechanism 1 is mounted on the rear axle housing of the vehicle adjacent a wheel. While only the two rear auxiliary brake operating devices are shown it is understood that there may be one at each wheel which is provided with a brake therefor. The shielding cover 3 as shown in FIGS. 2 and 3 is made of a metal which is capable of withstanding the shock of an explosion without shattering or cracking if the casing 1 of the auxiliary brake operating mechanism should suddenly give way due to internal stresses. The cover 3 is of the shape, and to fit over the casing 1 and is provided at its closed end with an opening 9 to accommodate a control member projecting from the casing and used for adjusting, disabling or emergency release usually provided with the auxiliary brake device.

Figure 4:
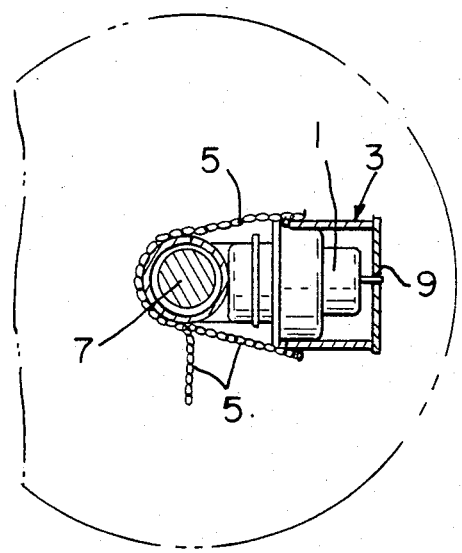
FIG. 4 is a side view showing the device of FIG. 3 in use taken along the lines 4-4 of FIG. 1.

In operation, as shown in FIG. 4, the shielding cover 3 is slid over the casing 1 and the chains 5, which may have hooks or similar devices attached to their free ends, are detachably secured to the chassis or rear axle cover 7 to maintain the cover on the casing. While the device of our invention is simple and easy to produce, it fills a need to protect workers servicing large vehicles provided with auxiliary brake devices.

Having thus described the invention and its utility with the particularity required by the statutes, the spirit and scope of the invention for which patent protection is sought are depicted by the following claims.

We claim:

1. In a wheeled vehicle provided with standard wheel braking means including a central fluid pressure system for operating the braking means and provided with auxiliary brake operating mechanism subject to the same air pressure as the standard brake operating means and mounted on the vehicle adjacent a wheel to be braked and comprising a cylindrical casing containing the auxiliary brake operating mechanism including compressed air; a removable safety cover about said casing and means for releasably securing said cover member to the vehicle while in place about said casing.

2. In a wheeled vehicle according to claim 1, wherein the safety cover is provided with anchor means on its periphery, and elongated flexible members having one end secured to said anchor means and removably secured at the other end to a selected part of the vehicle for retaining the cover about said casing.

* * * * *